US010670137B2

(12) United States Patent
Allbritten et al.

(10) Patent No.: US 10,670,137 B2
(45) Date of Patent: Jun. 2, 2020

(54) SELF CONTAINED BEARING BOX COOLING SYSTEM

(71) Applicant: Sundyne, LLC, Arvada, CO (US)

(72) Inventors: Brian R. Allbritten, Arvada, CO (US); Christopher L. Linrud, Morrison, CO (US)

(73) Assignee: Sundyne, LLC, Arvada, CO (US)

( * ) Notice: Subject to any disclaimer, the term of this patent is extended or adjusted under 35 U.S.C. 154(b) by 224 days.

(21) Appl. No.: 15/480,045

(22) Filed: Apr. 5, 2017

(65) Prior Publication Data
US 2018/0291998 A1  Oct. 11, 2018

(51) Int. Cl.
| F16H 57/04 | (2010.01) |
| F16C 33/66 | (2006.01) |
| F16C 37/00 | (2006.01) |
| F04D 13/06 | (2006.01) |
| F04D 29/06 | (2006.01) |
| F04D 29/056 | (2006.01) |
| F04D 29/58 | (2006.01) |
| H02K 9/06 | (2006.01) |
| H02K 9/19 | (2006.01) |
| F16C 33/10 | (2006.01) |

(52) U.S. Cl.
CPC ......... *F16H 57/0416* (2013.01); *F04D 13/06* (2013.01); *F04D 29/056* (2013.01); *F04D 29/061* (2013.01); *F04D 29/58* (2013.01); *F04D 29/588* (2013.01); *F16C 33/1025* (2013.01); *F16C 33/6637* (2013.01); *F16C 37/00* (2013.01); *F16H 57/0417* (2013.01); *H02K 9/06* (2013.01); *H02K 9/19* (2013.01)

(58) Field of Classification Search
CPC ...... F04D 13/06; F04D 29/056; F04D 29/061; F04D 29/58; F04D 29/588; F16C 33/1025; F16C 33/6637; F16C 37/00; F16C 37/007; H02K 9/06; H02K 9/19; F16H 57/0416; F16H 57/0417
See application file for complete search history.

(56) References Cited

U.S. PATENT DOCUMENTS 3,441,762 A * 4/1969 Luenberger ............ H02K 7/116
                                                               310/157
4,270,064 A   5/1981 Glandorf et al.
(Continued)

OTHER PUBLICATIONS

Extended European Search Report for Application No. EP 18165936.8 dated Aug. 28, 2018, 7 pages.

*Primary Examiner* — Alan B Waits
(74) *Attorney, Agent, or Firm* — Frost Brown Todd LLC (57) ABSTRACT

An oil cooling system for a motorized pump is described. The motorized pump includes an oil sump and oil flow path, the oil sump and oil flow path containing oil to lubricate and remove heat from a bearing assembly and drive shaft. A motor coupling housing attached to a bearing box holding the bearing assembly includes an interior space that houses an oil cooling system. The oil cooling system includes a finned cooling tube connected to an outlet of an oil flow path in the bearing box. A fan is connected to the drive shaft of the motorized pump, and is situated to force air over the cooling tube and plurality of fins such that hot oil received by the cooling system is cooled and the cooled oil is returned to the oil flow path in the bearing box.

15 Claims, 7 Drawing Sheets

(56) References Cited

U.S. PATENT DOCUMENTS

2006/0093250 A1\* 5/2006 Kreitzer .................. F16C 33/66
                                                                  384/476
2009/0250197 A1    10/2009 Hassett et al.
2014/0271284 A1     9/2014 Gray et al.

\* cited by examiner

SELF CONTAINED BEARING BOX COOLING SYSTEM

TECHNICAL FIELD

The present disclosure is directed to motorized pumps and more specifically to oil cooling systems for the bearings and bearing boxes of motorized pumps.

BACKGROUND OF THE INVENTION

Many motorized pumps include bearings housed in bearing boxes. The bearings allow for the low friction spinning of the pump shaft driven by a motor. Oil is circulated within bearing box to lubricate the bearings and shaft as it spins. The bearings on the shaft of a bearing box generate heat dependent on many factors including the amount of load they experience. For bearings that are lubricated through a pressure lube system, which is a self-contained system that circulates oil through a bearing box, the oil absorbs the heat and transfers it away. That heat needs to be removed from the assembly in some fashion. Typically, this is done by circulating the oil through a water cooled heat exchanger or using a fan to blow air past the bearing box itself and allowing the heat to conduct through the bearing box before being dissipated to the surrounding air.

Unfortunately, the water cooled heat exchanger solution requires a cold water supply, which is often not available or more expensive to pipe into the area. In addition, relying on conduction through the bearing box develops a significant temperature difference between the oil and the outside of the bearing box, which decreases the heat transfer capability drastically. If the bearings generate any significant amount of heat, the oil quickly reaches and goes beyond its max working temperature. Another cooling method may include an oil-to-air heat exchanger external to the pump with an electric motor driven fan or relying on natural convection. However, in hazardous environments, the fins on these types of heat exchangers can become damaged very easily in addition to the need to provide power for any fan used. Therefore, it was determined to look at utilizing air cooling to remove the need for any additional resources, while minimizing the temperature gradient between the oil and the external heat transfer surface area.

BRIEF SUMMARY OF THE INVENTION

In accordance with a preferred embodiment a cooling system for cooling oil from a bearing box in a motorized pump is described. The motorized pump has a drive shaft and a motor coupling housing attached to the bearing box. The cooling system includes a cooling tube connected to an outlet of an oil flow path in the bearing box that receives hot oil from the bearing box and passes cooled oil back to the bearing box. A plurality of fins are attached to the cooling tube to increase the surface area for heat transfer in the cooling system. A fan connected to the drive shaft of the motorized pump is situated to force air over the cooling tube and plurality of fins.

In accordance with another preferred embodiment a motorized pump assembly is described. The motorized pump includes a drive shaft driven by the motorized pump and a bearing box housing. The bearing box housing has a bearing assembly coupled to the drive shaft and includes an oil sump and oil flow path, where the oil sump and oil flow path contain an oil to lubricate and remove heat from the bearing assembly and drive shaft. A motor coupling housing is attached to the bearing box and includes an interior space therein. A cooling system is contained within the interior space of the motor coupling housing and receives hot oil from the oil flow path in the bearing box. The cooling system includes a cooling tube connected to an outlet of an oil flow path in the bearing box. The cooling tube has a plurality of fins attached thereto to increase a heat transfer surface area. A fan connected to the drive shaft of the motorized pump is situated to force air over the cooling tube and plurality of fins. The cooled oil is then returned to the oil flow path in the bearing box.

In yet another preferred embodiment a method for cooling oil in a motorized pump is described. The method includes circulating oil through a bearing box to lubricate and remove heat from a bearing assembly and a pump drive shaft and forcing the oil out of the bearing box and into a cooling system, the cooling system contained within the interior space of a motor coupling housing and receiving hot oil from an oil flow path in the bearing box. The oil is then circulated through a cooling tube in the cooling system, where the cooling tube has a plurality of fins attached thereto to increase a heat transfer surface area. Air is forced across the cooling tube using a fan connected to the pump drive shaft of the motorized pump. The cooled oil is then returned to the oil flow path in the bearing box.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

A self contained bearing box cooling system is described herein. Preferred embodiments of a cooling system according to the concepts described herein include a finned piece of tubing that is placed in the motor coupling housing. A fan is mounted to the shaft that then blows ambient air over the cooler to remove heat. The motor coupling housing protects the cooler from the external environment, while the fan located on the shaft does not require any additional motors to be incorporated. The fins on the tubing provide increased heat transfer area with small thermal gradients.

Figure 1:
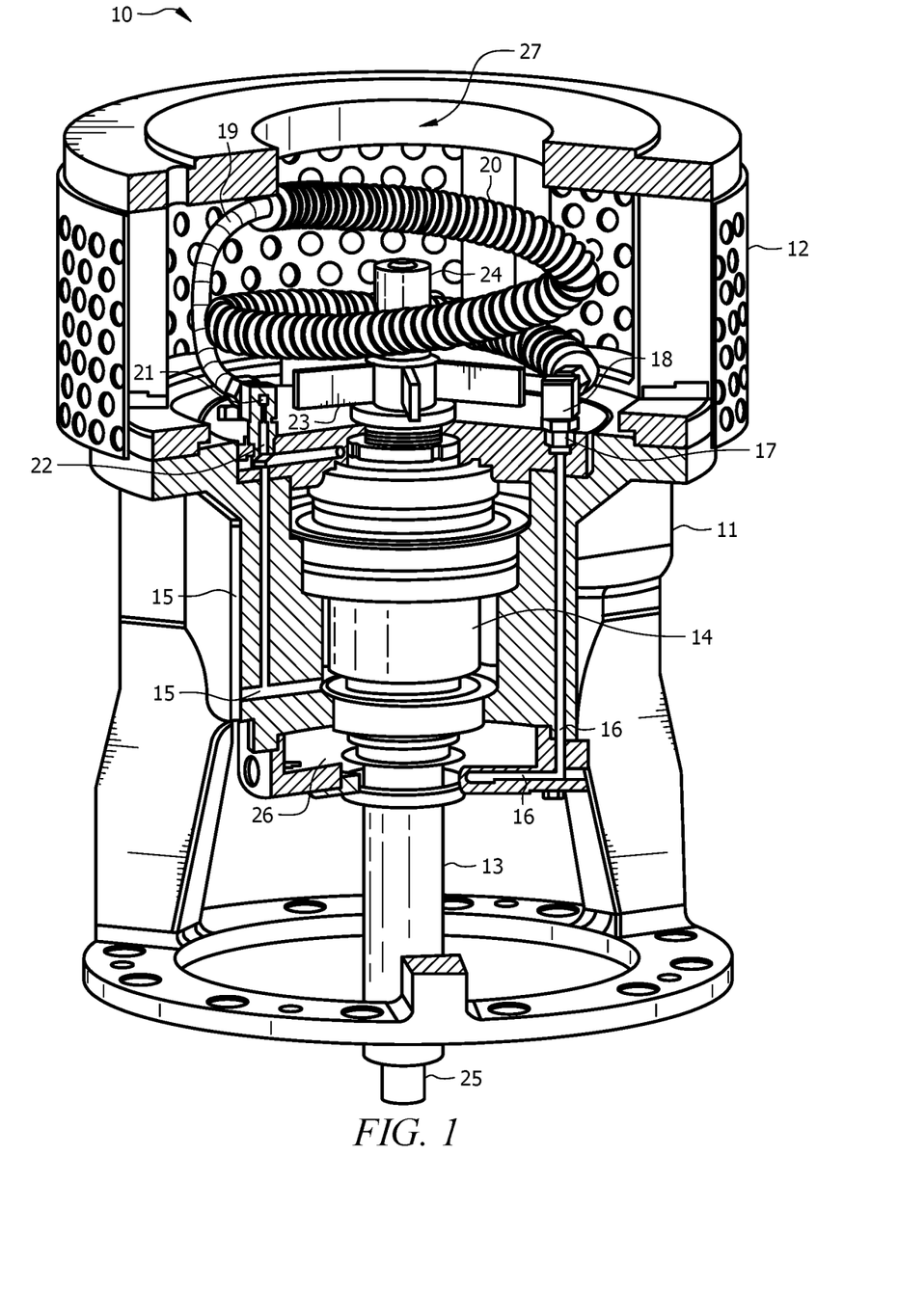
FIG. 1 is a cut-away view of a preferred embodiment of a bearing box oil cooling system according to the concepts described herein.

Referring now to FIG. 1, a preferred embodiment of a cooling system according to the concepts described herein is shown. Bearing box/cooling system assembly 10 includes bearing box 11 coupled to motor coupling housing 12. Bearing box 11 includes a recess to hold bearing assembly 14 which coupled to motor shaft 13. Motor shaft 13 is coupled to a motor (not shown) at proximate end 24 and to a pump (not shown) at distal end 25. Bearing assembly 14 provides for the shaft 13 to spin at low friction using oil contained in the bearing box 11.

The bearing oil flows from the sump 26 up through oil outlet path 16 in the bearing box 11 and into the cooler assembly 27. As it circulates through the cooler assembly 27, heat is transferred to the environment by forced convection. A fan 23, which is mounted to the proximate end 24 of shaft 13 just outside of bearing box 11, blows ambient air over the cooler system 27 to drive the forced convection heat transfer. Motor Housing Coupling preferably includes perforation to allow air flow into and out of the space containing cooling system 27. Tube 19 that contains the oil is connected to inlet coupling 18, which connects outlet 17 of oil outlet path 16 to tube 19 allowing the oil to flow into cooling system 27. Tube 19 has one or more fins 20 attached to increase the available area for heat transfer. Additionally the length of the tube can be selected to achieve the desired amount of heat transfer with longer tubes providing more heat transfer. Tube 19 preferably forms a coiled path within the motor coupling housing but can traverse any path that fits within the interior space. Generally, the more fins 20 attached to tube 19 the greater surface area for heat transfer. The increased heat transfer associated with fins 20 allow the cooler system 27 to be more compact and thereby fit into the space inside the motor coupling housing between the bearing box 11 and the motor.

The oil then exits the cooling system 27 through the outlet coupler 21 to the inlet 22 of oil inlet path 15 at a lower temperature than the inlet to cooling system 27 and flows to the bearing assembly through oil inlet path 15 to provide lubrication and cooling of bearing assembly 14. The oil then flows down into a sump 26 and begins the circulation process again. Cooling system 27 is preferably strategically placed inside the motor coupling housing 12 to protect it from damage from external factors.

Previous cooling strategies do not use a fan to cool the oil when it is passing through a tube or any sort of heat exchanger. Prior strategies all indirectly cool the oil by cooling the bearing box or through the shaft. Any sort of cooling mechanism that is applied is either water cooled or sits outside of the pump/bearing box and is either more prone to damage or requires a separate cage or other mechanism to protect it.

Figure 2:
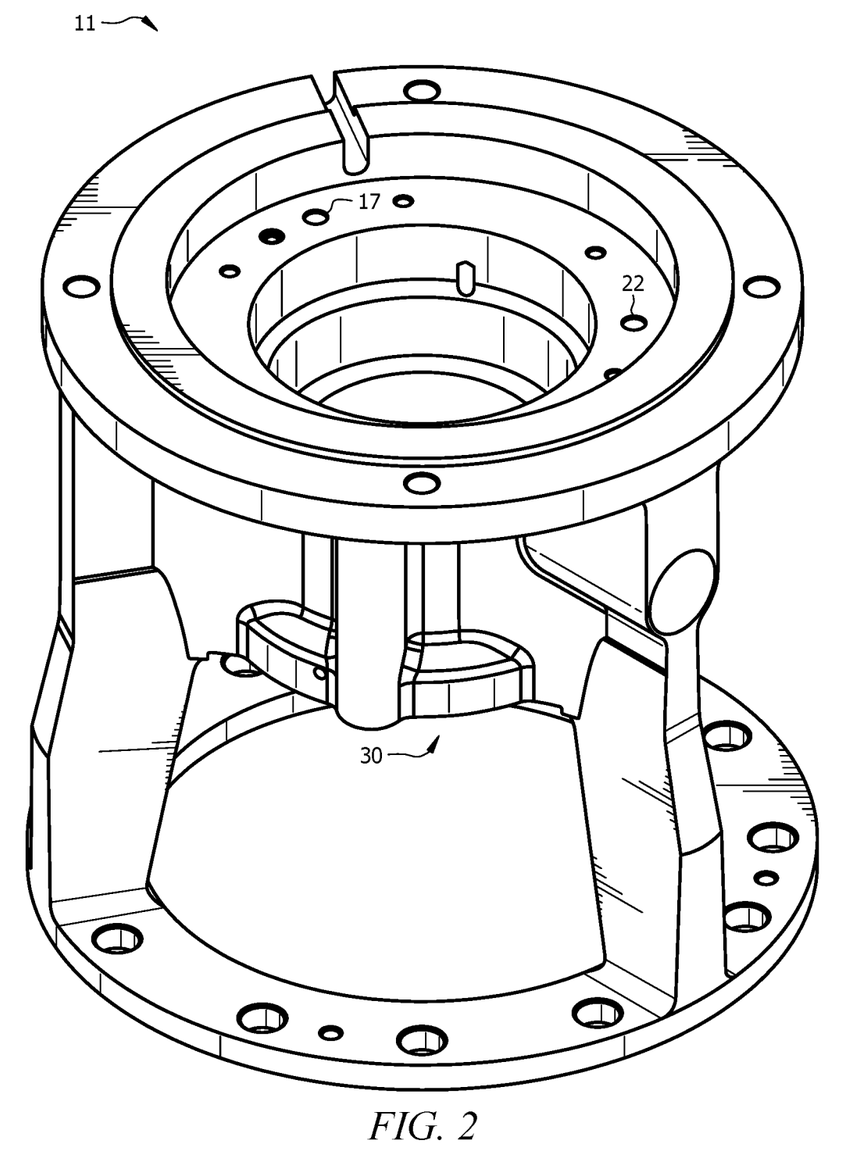
FIG. 2 is a perspective view of the embodiment of the bearing box shown in FIG. 1.

Referring now to FIG. 2, the preferred embodiment of a bearing box according to the concepts described herein is shown. Bearing box 11 includes a cavity to hold a bearing assembly as shown in FIG. 1. Bearing box 11 also includes passages formed into the bearing box structure, such as oil flow paths such as outlet oil flow path 16 and inlet oil flow path 15 shown in FIG. 1. Those passages end in outlet 17 to which a coupling to a cooling system as described herein is connected and an inlet to which the outlet of the cooling system is connected, thereby returning the cooled oil to the bearing box.

Figure 3:
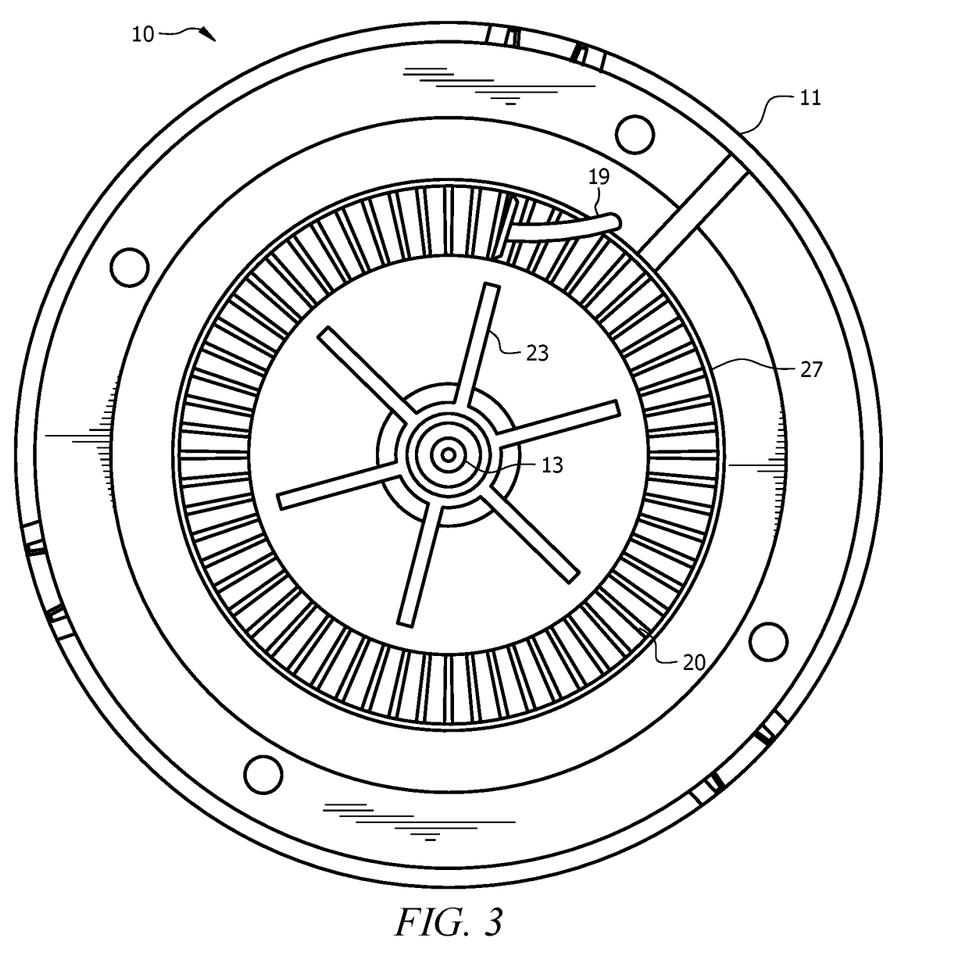
FIG. 3 is a top view of the embodiment of the bearing box with an oil cooling system shown in FIG. 1.
Figure 4:
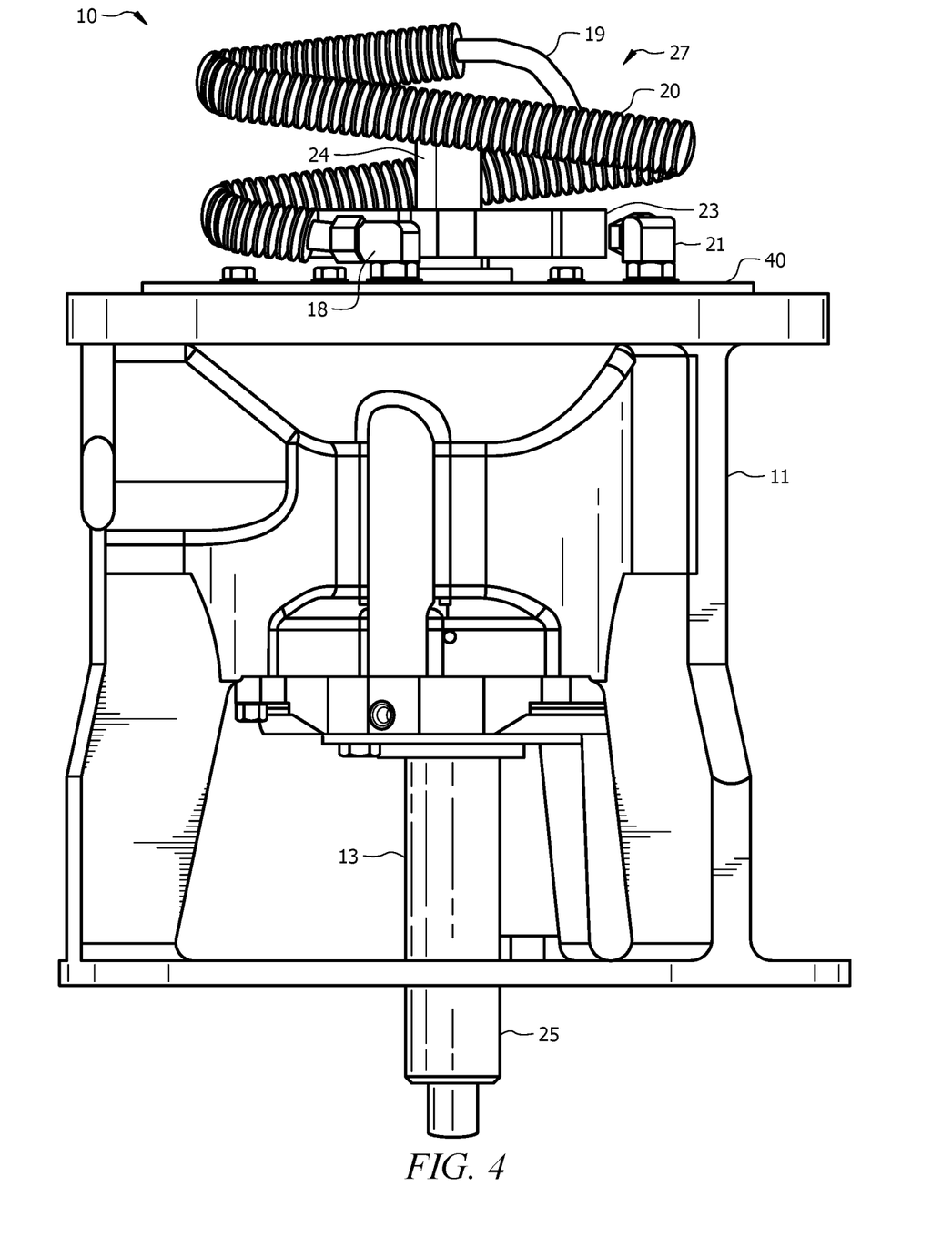
FIG. 4 is a side view of the embodiment of the bearing box with an oil cooling system shown in FIG. 1.

Referring now to FIGS. 3 and 4, a top view and a side view of the embodiment of the cooling system described in FIG. 1 are shown with the motor coupling housing removed. As described, bearing box/cooling system assembly 10 includes bearing box 11 and cooling system 27 attached to a top 40 of bearing box 11. Shaft 13 passes through bearing box 11 and has fan 23 attached thereto. Fan 23 forces air over tube 19 and fins 20 to promote heat transfer from the circulating oil to the air through tube 19 and fins 20.

Hot oil passes into tube 19 through inlet coupling 18 which is attached to an oil outlet path in bearing box 11. The oil then circulates through tube 19 and then the cooled oil returns to bearing box 11 through outlet coupling 21 which is connected to an inlet fluid path in bearing box 11.

Figure 5:
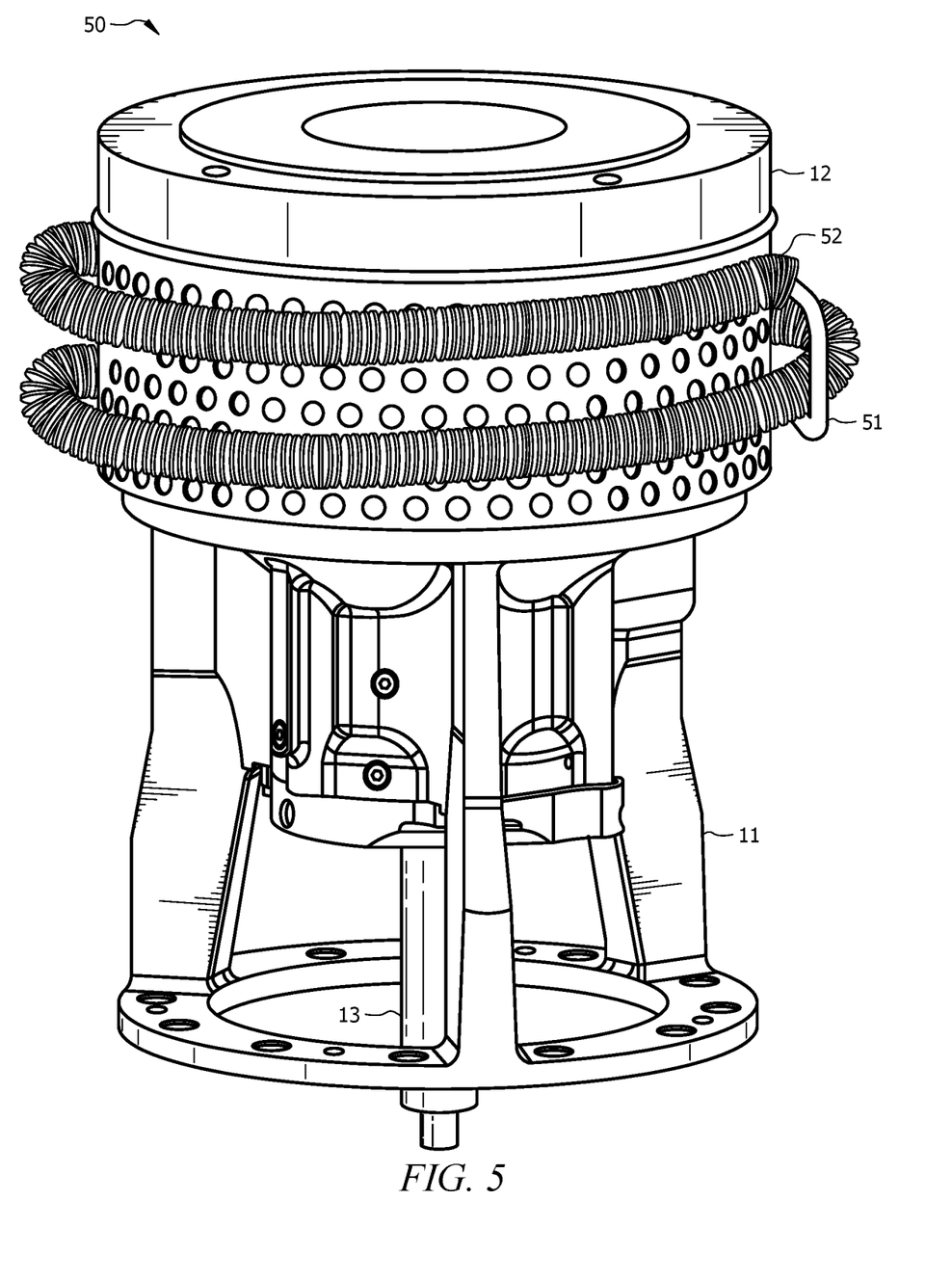
FIG. 5 is a perspective view of an alternative embodiment of a cooling system according to the concepts described herein.

Referring now to FIG. 5, an alternate embodiment of a cooling system according to the concepts described herein is shown. Cooling system 50 functions just as assembly 10 shown in FIG. 1 except that system 50 has cooling tube 51 and fins 52 on the outside of motor coupling housing 12. Cooling tube 51 still takes hot oil from bearing box 11 and circulates it through cooling tube 19 before returning the cooled oil back to bearing box 11. Shaft 13 still has a fan (not shown) attached to it inside the coupling housing 12 to force air across cooling tube 51 and fins 52.

Figure 6:
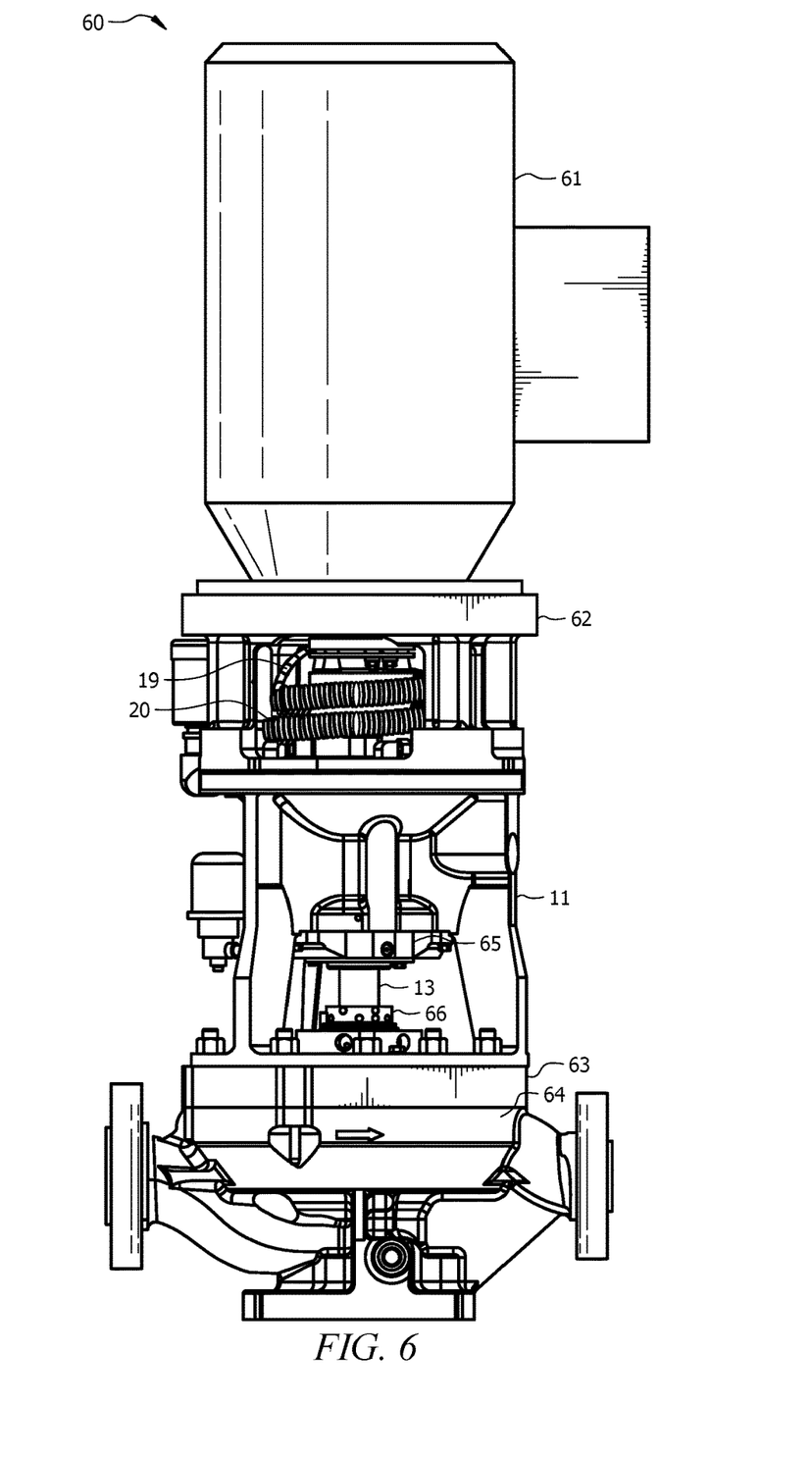
FIG. 6 is a side view of an embodiment of a complete pump assembly incorporating a cooling system according to the concepts described herein.

Referring now to FIG. 6, an embodiment of a complete pump system incorporating the concepts described herein is shown. Pump system 60 includes motor 61, coupling housing 62, cooling tubing 19 and fins 20, bearing box 11, seal housing 63 and pump case 64. Shaft 13 extends from motor 61 to pump case 64 and is driven by motor 61 to operate the pump in pump case 64. Shaft 13 extends through bearing box 11, which is operable to enable shaft 13 to spin with minimum friction. Oil sump 65 in bearing box 11 holds an oil supply which is circulated through bearing box 11 and cooling tubing 19 to lubricate the shaft and to remove heat from the system. Seal housing 63 sits between bearing box 11 and pump case 64 and cartridge seal 66 seals the opening where shaft 13 enters pump case 64.

As described, a fan attached to the shaft proximate the coupling housing is spun by the shaft in normal operation and forces air across the cooling tubing 19 and fins 20. While the coupling housing in FIGS. 1 and 5 have a perforated shielding, the shielding may be omitted as shown in FIG. 6.

Figure 7:
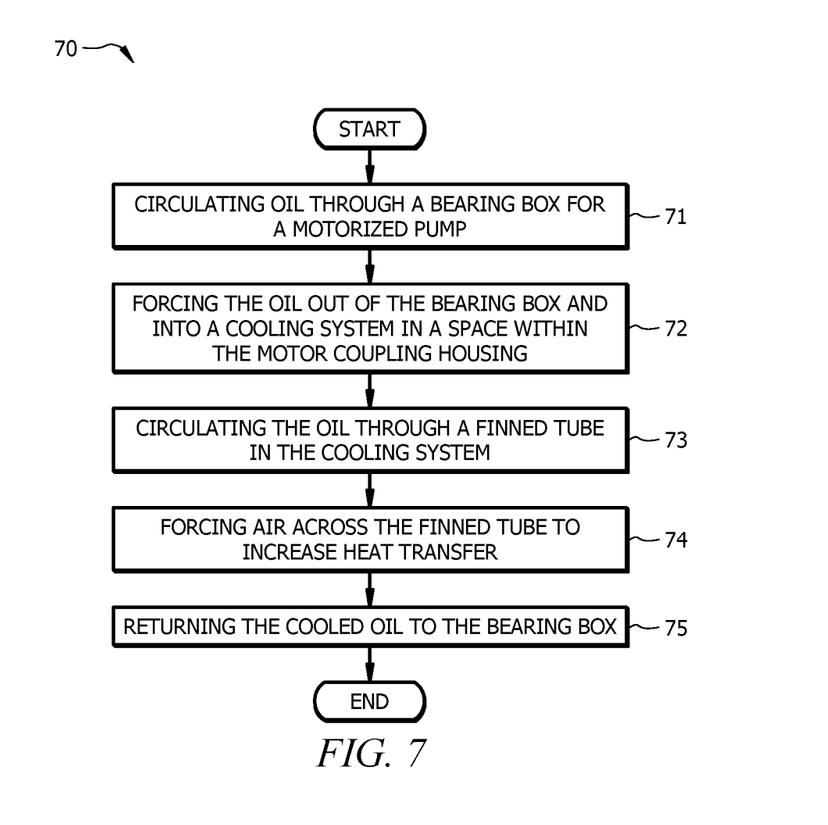
FIG. 7 is a flow chart showing an embodiment of a method of cooling bearing box oil according to the concepts described herein.

Referring now to FIG. 7, an embodiment of a method for cooling bearing box oil in a motorized pump is described. Method 70 begins with oil circulating in a bearing box as shown in step 71. The circulating oil is then forced out of the bearing box and into a cooling system housed in an interior space of the motor coupling housing, as shown in step 72. The oil is then circulated through a finned tube in the cooling system, step 73, while air is forced across the finned tube by a fan to increase heat transfer, step 74. The cooled oil is then returned to the bearing box in step 75.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A cooling system for a motorized pump assembly for cooling oil from a bearing assembly, a motorized pump including a drive shaft, and a motor coupled to the drive shaft, the comprising:
   a unitary bearing box holding the bearing assembly and having the drive shaft extending through an interior of the bearing box, the bearing box forming at least one wall of an oil sump holding the oil, the bearing box further including an outlet oil flow path and an inlet oil flow path integral to the bearing box;
   a motor coupling housing connected to the bearing box at a first end and to the motor at a second end;
   a cooling tube inside the motor coupling housing, the cooling tube connected to an outlet of the outlet oil flow path in the bearing box, the cooling tube receiving hot oil from the bearing box and passing cooled oil back to the bearing box through the inlet oil flow path, wherein the cooled oil flows from the inlet flow path to the bearing assembly before draining into the oil sump;
   a plurality of fins attached to the cooling tube, the plurality of fins increasing a surface area for heat transfer in the cooling system; and
   a fan inside the motor coupling housing and connected to the drive shaft of the motorized pump, the fan situated to force air over the cooling tube and plurality of fins.

2. The cooling system of claim 1 wherein the fan is driven by the drive shaft which is spinning as a result of the operation of the pump.

3. The cooling system of claim 1 wherein the cooling system is connected to the bearing box using an inlet coupler and an outlet coupler.

4. The cooling system of claim 1 wherein the motor coupling housing is perforated to allow air flow to the cooling system.

5. The cooling system of claim 1 wherein the cooling tube forms a coiled path in the motor coupling housing.

6. A motorized pump comprising:
   a motor;
   a drive shaft driven by the motor;
   a unitary bearing box housing a bearing assembly coupled to the drive shaft and forming at least one wall of an oil sump and further including an outlet oil flow path and an inlet oil flow path integral to the bearing box, the oil sump and outlet oil flow path and inlet oil flow path containing oil to lubricate and remove heat from the bearing assembly and drive shaft;
   a motor coupling housing attached to the bearing box at a first end and the motor at a second end and including an interior space therein; and
   a cooling system contained within the interior space of the motor coupling housing and receiving hot oil from the oil flow path in the bearing box, the cooling system including a cooling tube connected to an outlet of the outlet oil flow path in the bearing box and to an inlet of the inlet oil flow path, the cooling tube having a plurality of fins attached thereto to increase a heat transfer surface area, the cooling system further including a fan connected to the drive shaft of the motorized pump, the fan situated to force air over the cooling tube and plurality of fins, wherein cooled oil is returned to the inlet oil flow path in the bearing box, wherein the cooled oil flows from the inlet flow path to the bearing assembly before draining into the oil sump.

7. The motorized pump of claim 6 wherein the fan is driven by the drive shaft which is spinning as a result of the operation of the pump.

8. The motorized pump of claim 6 wherein the cooling system is connected to the bearing box using an inlet coupler and an outlet coupler.

9. The motorized pump of claim 6 wherein the motor coupling housing is perforated to allow air flow to the cooling system.

10. The motorized pump of claim 6 wherein the cooling tube forms a coiled path in the motor coupling housing.

11. A method for cooling oil in a motorized pump comprising:
    circulating oil through a unitary bearing box to lubricate and remove heat from a bearing assembly and a pump drive shaft, wherein the unitary bearing box holds the bearing assembly and has the pump drive shaft extending through an interior of the bearing box, the bearing box forming at least one wall of an oil sump holding the oil, the bearing box further including an outlet oil flow path and an inlet oil flow path integral to the bearing box;
    forcing the oil out of the bearing box through the outlet oil flow path and into a cooling system, the cooling system contained within the interior space of a motor coupling housing, and receiving hot oil from the outlet oil flow path in the bearing box, wherein the motor coupling housing couples to the bearing box at a first end and a motor at a second end, the interior space defined therebetween;
    circulating the oil through a cooling tube in the cooling system, the cooling tube having a plurality of fins attached thereto to increase a heat transfer surface area;
    forcing air across the cooling tube using a fan connected to the pump drive shaft of the motorized pump; and
    returning cooled oil to the inlet oil flow path in the bearing box, wherein the cooled oil flows from the inlet flow path to the bearing assembly before draining into the oil sump.

12. The method of claim 11 wherein the fan is driven by the drive shaft which is spinning as a result of the operation of the pump.

13. The method of claim 11 wherein the cooling system is connected to the bearing box using an inlet coupler and an outlet coupler.

14. The method of claim 11 wherein the motor coupling housing is perforated to allow air flow to the cooling system.

15. The method of claim 11 wherein the cooling tube forms a coiled path in the motor coupling housing.

\* \* \* \* \*